(12) United States Patent
Bergin et al.

(10) Patent No.: US 11,023,964 B2
(45) Date of Patent: Jun. 1, 2021

(54) SYSTEMS, DEVICES, AND METHODS FOR INTERACTIONS WITH AN ACCOUNT

(71) Applicant: ASB Bank Limited, Auckland (NZ)

(72) Inventors: James David Bergin, Auckland (NZ); Shane Raymond Hughes, Auckland (NZ); Phil Middlebrook, Auckland (NZ); Shane Paul Evans, Auckland (NZ); Timothy Paul Huffam, Auckland (NZ); Raymond Kok Ho Chan, Auckland (NZ); Neill Darryl McAlpine, Auckland (NZ); Nicole Patricia Sykes, Auckland (NZ)

(73) Assignee: ASB Bank Limited, Auckland (NZ)

(*) Notice: Subject to any disclaimer, the term of this patent is extended or adjusted under 35 U.S.C. 154(b) by 531 days.

(21) Appl. No.: 15/740,682

(22) PCT Filed: Jul. 1, 2016

(86) PCT No.: PCT/NZ2016/050110
§ 371 (c)(1),
(2) Date: Dec. 28, 2017

(87) PCT Pub. No.: WO2017/003304
PCT Pub. Date: Jan. 5, 2017

(65) Prior Publication Data
US 2018/0197238 A1    Jul. 12, 2018

(30) Foreign Application Priority Data
Jul. 2, 2015   (NZ) ........................................ 709570

(51) Int. Cl.
*G06Q 40/00*   (2012.01)
*G06Q 40/02*   (2012.01)
(Continued)

(52) U.S. Cl.
CPC ............. *G06Q 40/02* (2013.01); *G06Q 20/32* (2013.01); *G06F 3/017* (2013.01); *G06F 3/0486* (2013.01)

(58) Field of Classification Search
CPC ........ G06Q 40/00; G06Q 40/02; G06Q 20/32; G06F 3/017; G06F 3/0486
See application file for complete search history.

(56) References Cited

U.S. PATENT DOCUMENTS

| 4,007,355 A | 2/1977 | Moreno |
| 4,305,059 A | 12/1981 | Benton |

(Continued)

FOREIGN PATENT DOCUMENTS

| JP | 09237300 | 9/1997 |
| JP | 2006048270 | 2/2006 |

(Continued)

OTHER PUBLICATIONS

Lockbox: mobility, privacy and values in cloud storage Stark, Luke; Tierney, Matt. Ethics and Information Technology; Dordrecht vol. 16, Iss. 1, (Mar. 2014): 1-13. (Year: 2014).*

(Continued)

*Primary Examiner* — Lalita M Hamilton
(74) *Attorney, Agent, or Firm* — Gable Gotwals

(57) ABSTRACT

A system and method for management of a financial account maintained by a financial entity is described. A user device may receive historical information relating to the financial account, including a monetary value of at least one individual transaction of the financial account which has occurred prior. A virtual representation of the monetary value may be displayed. The virtual representation may be selected for transmission to a dedicated digital money box device. The dedicated digital money box device may display an indication of a monetary value of a balance of the selected (Continued)

virtual representation, and historical information previously received by the dedicated digital money box device.

34 Claims, 8 Drawing Sheets

(51) Int. Cl.
*G06Q 20/32* (2012.01)
*G06F 3/01* (2006.01)
*G06F 3/0486* (2013.01)

(56) References Cited

U.S. PATENT DOCUMENTS

| | | | |
|---|---|---|---|
| 4,454,414 A | 6/1984 | Benton | |
| 5,455,407 A | 10/1995 | Rosen | |
| 6,467,685 B1 | 10/2002 | Teicher | |
| 6,729,884 B1 | 5/2004 | Kelton et al. | |
| 8,401,938 B1* | 3/2013 | Chapman | G06Q 20/3255 |
| | | | 705/34 |
| 8,458,088 B2 | 6/2013 | Dunwoody | |
| 10,169,812 B1* | 1/2019 | Bajgier | G06Q 40/02 |
| 2004/0039701 A1 | 2/2004 | Nakamura et al. | |
| 2006/0235777 A1 | 10/2006 | Takata | |
| 2008/0281721 A1 | 11/2008 | Simunovic | |
| 2009/0204538 A1* | 8/2009 | Ley | G06Q 20/10 |
| | | | 705/40 |
| 2009/0287529 A1* | 11/2009 | Johnson | G06Q 40/02 |
| | | | 705/39 |
| 2011/0087985 A1* | 4/2011 | Buchanan | G06F 3/04847 |
| | | | 715/771 |
| 2012/0264089 A1 | 10/2012 | Hoang et al. | |
| 2013/0262298 A1 | 10/2013 | Morley | |
| 2013/0273843 A1 | 10/2013 | Shimota et al. | |
| 2014/0279531 A1 | 9/2014 | Levkovitz et al. | |
| 2016/0026999 A1* | 1/2016 | Kurian | G06Q 20/363 |
| | | | 705/44 |

FOREIGN PATENT DOCUMENTS

| | | |
|---|---|---|
| WO | 2006076266 | 7/2006 |
| WO | 2012122994 | 9/2012 |
| WO | 2014181185 | 11/2014 |
| WO | 2014181187 | 11/2014 |

OTHER PUBLICATIONS

"The Kids Money Box", online at http://thekidsmoneybox.com/.
Betsy Scherzer Roberts, "ABC News 8 in DC-Let's Talk Live [Rudy in-studio interview] (Mar. 22, 2011—TELEVISION.wmv" Mar. 24, 2011 online at https://www.youtube.com/watch?v=bQm62dbD0Ww&feature=related.
"Family Mint", online at http://familymint.com/.
"FamZoo", Preparing Kids for the Financial Jungle, online at http://www.famzoo.com/.

* cited by examiner

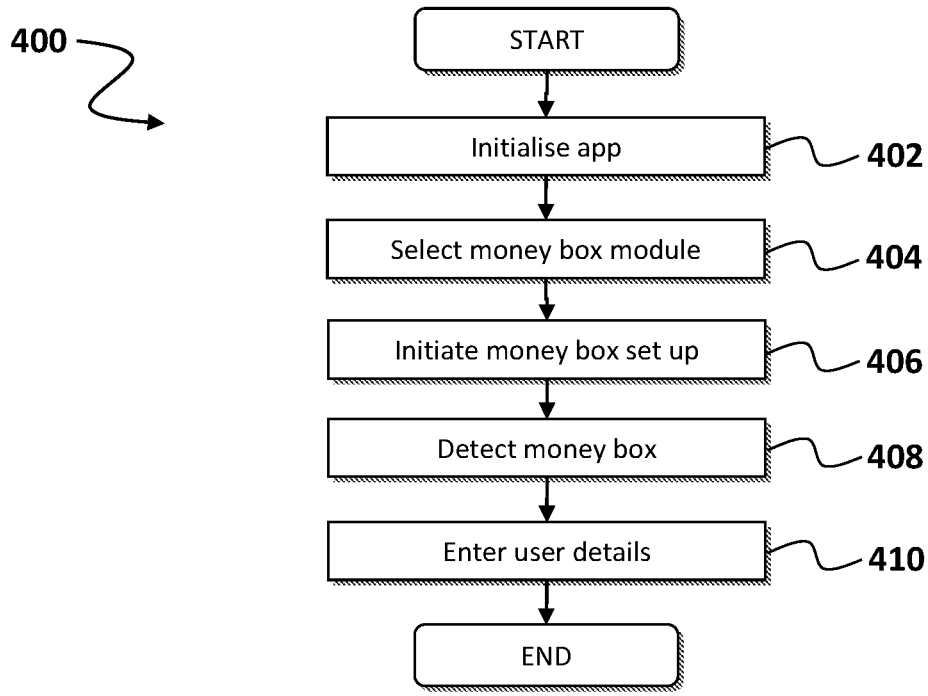
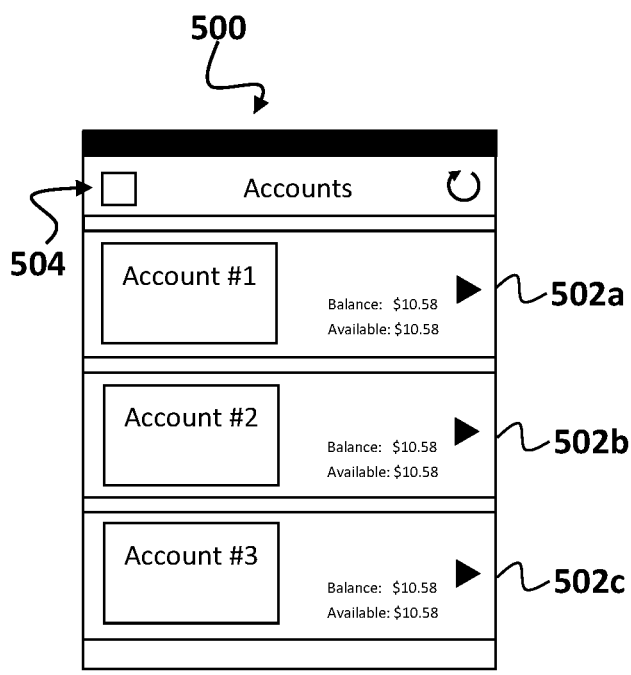
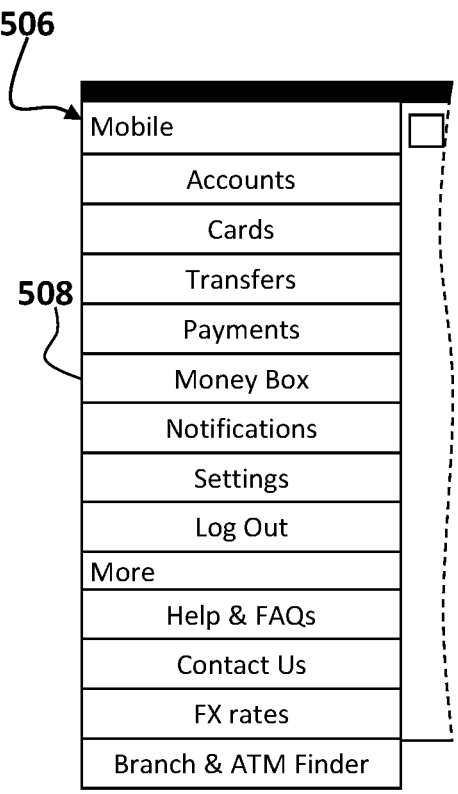

SYSTEMS, DEVICES, AND METHODS FOR INTERACTIONS WITH AN ACCOUNT

CROSS-REFERENCE TO RELATED APPLICATIONS

This United States application is the National Phase of PCT Application No. PCT/NZ2016/050110 filed 1 Jul. 2016, which claims priority to New Zealand Patent Application No. 709570 filed 2 Jul. 2015, each of which is incorporated herein by reference.

BACKGROUND OF THE INVENTION

Statement of Corresponding Applications

This application is based on the Provisional specification filed in relation to New Zealand Patent Application Number 709570, the entire contents of which are incorporated herein by reference.

TECHNICAL FIELD

Embodiments of the disclosure relate to systems, methods, and devices for interaction with an account—more particularly a financial account.

BACKGROUND

The importance of financial literacy to personal well-being is widely recognised. Numerous programmes and resources exist for providing financial literacy education to people of all ages and walks of life, including children. Many banking institutions offer bank accounts designed for use by children (or at least on their behalf), supported by educational programmes and resources to encourage positive saving and spending habits.

The management of financial accounts, including performing transactions and monitoring account activity, is becoming increasingly virtualised. However the tools and interfaces available to adults for these purposes may not be suitable for children, for example in terms of: cognitive development, desire of their guardian to limit access to broader functionality associated with those tools, or legal and ethical responsibilities of the provider of the account. As a result, resources for a child's management of their finances are at risk of becoming increasingly divergent from those which they will be expected to use in later stages of life.

Further, the associated digitalisation of money reduces opportunities for children to gain an appreciation for its tangibility through traditional transactions in which they physically receive, save, and spend money.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Further aspects and advantages of the present invention will become apparent from the ensuing description which is given by way of example only.

SUMMARY

According to one aspect of the present disclosure there is provided a method for interacting with a financial account maintained by a financial entity. The method may include the step of receiving, by a user device, historical information relating to the financial account. The method may include the step of transmitting, from a communication device of the user device, a signal indicative of at least a portion of the historical information, to be received by a dedicated digital money box and displayed on a display device of the dedicated digital money box.

According to one aspect of the present disclosure there is provided a computer readable medium having stored thereon processor readable instructions, which when executed by at least one processor cause the processor to perform a method for interacting with a financial account maintained by a financial entity. The instructions may include instructions for receiving, by a user device, historical information relating to the financial account. The instructions may include instructions for transmitting, from a communication device of the user device, a signal indicative of at least a portion of the historical information, to be received by a dedicated digital money box and displayed on a display device of the dedicated digital money box.

According to one aspect of the present disclosure there is provided a user device. The user device may include a communications device. The user device may include at least one processor. The at least one processor may be configured to receive historical information relating to the financial account. The at least one processor may be configured to transmit, from the communication device, a signal indicative of at least a portion of the historical information, to be received by a dedicated digital money box and displayed on a display device of the dedicated digital money box.

According to one aspect of the present disclosure there is provided a method for interacting with a financial account maintained by a financial entity. The method may include the step of receiving, by a user device, historical information relating to the financial account. The method may include the step of displaying a virtual representation of at least a portion of the historical information on a display of the user device. The method may include the step of receiving, from a user input device of the user device, a signal indicating selection of the virtual representation by a user of the user device for transmission to a dedicated digital money box device. The method may include the step of transmitting, from a communication device of the user device, a signal indicative of the historical information associated with the selected virtual representation, to be received by the dedicated digital money box and displayed on a display device of the dedicated digital money box.

According to one aspect of the present disclosure there is provided a computer readable medium having stored thereon processor readable instructions, which when executed by at least one processor cause the processor to perform a method for interacting with a financial account maintained by a financial entity. The instructions may include instructions for receiving, by a user device, historical information relating to the financial account. The instructions may include instructions for displaying a virtual representation of at least a portion of the historical information on a display of the user device. The instructions may include instructions for receiving, from a user input device of the user device, a signal indicating selection of the virtual representation by a user of the user device for transmission to a dedicated digital money box device. The instructions may include instructions for transmitting, from a communication device of the user device, a signal indicative of the historical information associated with the selected virtual representation, to be received by the dedicated digital money box and displayed on a display device of the dedicated digital money box.

According to one aspect of the present disclosure there is provided a user device. The user device may include a display. The user device may include a user input device. The user device may include a communications device. The user device may include at least one processor. The at least one processor may be configured to receive historical information relating to the financial account. The at least one processor may be configured to display a virtual representation of at least a portion of the historical information on a display of the user device. The at least one processor may be configured to receive, from a user input device of the user device, a signal indicating selection of the virtual representation by a user of the user device for transmission to a dedicated digital money box device. The at least one processor may be configured to transmit, from the communication device of the user device, a signal indicative of the historical information associated with the selected virtual representation, to be received by the dedicated digital money box and displayed on a display device of the dedicated digital money box.

According to one aspect of the present disclosure there is provided a method for interacting with a financial account maintained by a financial entity. The method may include the step of receiving, by a dedicated digital money box device, a signal communicated from a user device, the signal indicative of historical information relating to the financial account. The method may include the step of displaying the historical information on a display device of the dedicated digital money box.

According to one aspect of the present disclosure there is provided a computer readable medium having stored thereon processor readable instructions, which when executed by at least one processor cause the processor to perform a method for interacting with a financial account maintained by a financial entity. The instructions may include instructions for receiving, by a dedicated digital money box device, a signal communicated from a user device, the signal indicative of historical information to the financial account. The instructions may include instructions for displaying the historical information on a display device of the dedicated digital money box.

According to one aspect of the present disclosure there is provided a dedicated digital money box device. The device may include a communication device. The device may include a display device. The device may include at least one processor. The at least one processor may be configured to receive a signal communicated from a user device, the signal indicative of historical information relating to a financial account. The at least one processor may be configured to display the historical information on the display device.

According to one aspect of the present disclosure there is provided a method for interacting with a financial account maintained by a financial entity. The method may include the step of receiving, by a dedicated digital money box device, a signal communicated from a user device, the signal indicative of historical information relating to the financial account and represented by a visual indication selected by a user after display on a display of the user device. The method may include the step of displaying the historical information on a display device of the dedicated digital money box.

According to one aspect of the present disclosure there is provided a computer readable medium having stored thereon processor readable instructions, which when executed by at least one processor cause the processor to perform a method for interacting with a financial account maintained by a financial entity. The instructions may include instructions for receiving, by a dedicated digital money box device, a signal communicated from a user device, the signal indicative of historical information relating to the financial account and represented by a visual indication selected by a user after display on a display of the user device. The instructions may include instructions for displaying the historical information on a display device of the dedicated digital money box.

According to one aspect of the present disclosure there is provided a dedicated digital money box device. The device may include a communication device. The device may include a display device. The device may include at least one processor. The at least one processor may be configured to receive a signal communicated from a user device, the signal indicative of historical information relating to a financial account and represented by a visual indication selected by a user after display on a display of the user device. The at least one processor may be configured to display the historical information on the display device of the dedicated digital money box device.

According to one aspect of the present disclosure there is provided a method for interacting with a financial account maintained by a financial entity. The method may include the step of receiving, by a user device, historical information relating to the financial account. The method may include the step of transmitting, from a communication device of the user device, a signal indicative of at least a portion of the historical information. The method may include the step of receiving, by a dedicated digital money box device, the signal indicative of the historical information. The method may include the step of displaying the historical information on a display device of the dedicated digital money box.

According to one aspect of the present disclosure there is provided a computer readable medium having stored thereon processor readable instructions, which when executed by at least one processor cause the processor to perform a method for interacting with a financial account maintained by a financial entity. The instructions may include instructions for receiving, by a user device, historical information relating to the financial account. The instructions may include instructions for transmitting, from a communication device of the user device, a signal indicative of at least a portion of the historical information. The instructions may include instructions for receiving, by a dedicated digital money box device, the signal indicative of the historical information. The instructions may include instructions for displaying the historical information on a display device of the dedicated digital money box.

According to one aspect of the present disclosure there is provided a system for management of a financial account maintained by a financial entity. The system may include a user device. The user device may include a communications device. The user device may include at least one processor.

The at least one processor of the user device may be configured to receive historical information relating to the financial account. The at least one processor of the user device may be configured to transmit, from the communication device, a signal indicative of at least a portion of the historical information. The system may include a dedicated digital money box device. The digital money box device may include a communication device. The digital money box device may include a display device. The digital money box device may include at least one processor. The at least one processor of the digital money box device may be configured to receive the signal indicative of the historical information. The at least one processor of the digital money box device may be configured to display the historical information on the display device.

According to one aspect of the present disclosure there is provided a method for interacting with a financial account maintained by a financial entity. The method may include the step of receiving, by a user device, historical information relating to the financial account. The method may include the step of displaying a virtual representation of at least a portion of the historical information on a display of the user device. The method may include the step of receiving, from a user input device of the user device, a signal indicating selection of the virtual representation by a user of the user device for transmission to a dedicated digital money box device. The method may include the step of transmitting, from a communication device of the user device, a signal indicative of the historical information associated with the selected virtual representation. The method may include the step of receiving, by the dedicated digital money box device, the signal indicative of the historical information. The method may include the step of displaying the historical information on a display device of the dedicated digital money box.

According to one aspect of the present disclosure there is provided a computer readable medium having stored thereon processor readable instructions, which when executed by at least one processor cause the processor to perform a method for interacting with a financial account maintained by a financial entity. The instructions may include instructions for receiving, by a user device, historical information relating to the financial account. The instructions may include instructions for displaying a virtual representation of at least a portion of the historical information on a display of the user device. The instructions may include instructions for receiving, from a user input device of the user device, a signal indicating selection of the virtual representation by a user of the user device for transmission to a dedicated digital money box device. The instructions may include instructions for transmitting, from a communication device of the user device, a signal indicative of the historical information associated with the selected virtual representation. The instructions may include instructions for receiving, by the dedicated digital money box device, the signal indicative of the historical information. The instructions may include instructions for displaying the historical information on a display device of the dedicated digital money box.

According to one aspect of the present disclosure there is provided a system for management of a financial account maintained by a financial entity. The system may include a user device. The user device may include a display. The user device may include a user input device. The user device may include a communications device. The user device may include at least one processor. The at least one processor of the user device may be configured to receive historical information relating to the financial account. The at least one processor of the user device may be configured to display a virtual representation of at least a portion of the historical information on a display of the user device. The at least one processor of the user device may be configured to receive, from a user input device of the user device, a signal indicating selection of the virtual representation by a user of the user device for transmission to a dedicated digital money box device. The at least one processor of the user device may be configured to transmit, from the communication device of the user device, a signal indicative of the historical information associated with the selected virtual representation. The system may include a dedicated digital money box device. The digital money box device may include a communication device. The digital money box device may include a display device. The digital money box device may include at least one processor. The at least one processor of the digital money box device may be configured to receive the signal indicative of the historical information. The at least one processor of the digital money box device may be configured to display the historical information on the display device.

According to one aspect of the present disclosure there is provided a system for management of a financial account maintained by a financial entity. The system may include a user device. The user device may include a display. The user device may include a user input device. The user device may include a communications device. The user device may include at least one processor. The at least one processor of the user device may be configured to receive historical information relating to the financial account, wherein the historical information includes at least a monetary value of at least one individual transaction of the financial account which has occurred prior to receiving of the historical information. The at least one processor of the user device may be configured to display a virtual representation of the monetary value of at least the individual transaction on the display of the user device. The at least one processor of the user device may be configured to receive, from the user input device of the user device, a signal indicating selection of the virtual representation by a user of the user device for transmission to a dedicated digital money box device. The at least one processor of the user device may be configured to transmit, from the communication device of the user device, a signal indicative of at least the historical information associated with the selected virtual representation. The system may include a dedicated digital money box device. The dedicated digital money box device may include a money box communication device. The dedicated digital money box device may include a money box display device. The dedicated digital money box device may include at least one processor. The at least one processor of the dedicated digital money box device may be configured to receive the signal indicative of at least the historical information associated with the selected virtual representation. The at least one processor of the dedicated digital money box device may be configured to display on the display device an indication of a monetary value of a balance of at least the historical information associated with the selected virtual representation, and historical information previously received by the dedicated digital money box device.

According to one aspect of the present disclosure there is provided a method for interacting with a financial account maintained by a financial entity. The method may include receiving, by a user device, historical information relating to the financial account, wherein the historical information includes at least a monetary value of an individual transaction of the financial account which has occurred prior to receiving of the historical information. The method may include displaying a virtual representation of the monetary value of at least the individual transaction on the display of the user device. The method may include receiving, from a user input device of the user device, a signal indicating selection of the virtual representation by a user of the user device for transmission to a dedicated digital money box device. The method may include transmitting, from the user device, a signal indicating selection of the virtual representation by a user of the user device for transmission to a dedicated digital money box device. The method may include receiving, by the dedicated digital money box device, the signal indicative of at least the historical information associated with the selected virtual representation. The method may include displaying, on a display device of the dedicated digital money box, an indication of a monetary value of a balance of at least the historical information associated with the selected virtual representation, and historical information previously received by the dedicated digital money box device.

Reference to a financial entity should be understood to mean any organization, entity, or the like in the business of moving, investing, or lending money, dealing in financial instruments, storing or tracking financial information, or providing financial products or services. For example, this may include commercial banks, thrifts, federal and state savings banks, savings and loan associations, credit unions, investment companies, insurance companies and the like.

Money or monetary value should be understood to include any currency, whether real or artificial. For example, artificial currency may include loyalty schemes or any other representation of value.

An account should be understood to be a means by which the relationship between the financial entity and the user is represented—for example, the money deposited with the financial entity by the user, or money owed to the entity by the user. Examples of accounts include a deposit account, such as a transactional account (e.g., a banking account), a savings account, an investment account, a money market account, a term deposit, a demand deposit, a pre-paid account, a debit account, a credit account, a loyalty account or the like. The account is associated with and/or maintained by the entity on behalf of the user. It should be appreciated that in exemplary embodiments the account may be administered by another party on behalf of the user—for example, a parent or guardian of a child.

The historical information relating to the financial account may be any desirable information relating to the financial account for processing and display in performing the present invention. For the sake of clarity, it should be appreciated that operation of the present invention does not result in control of the account itself—in particular the triggering or initiating of the transfer of money to or from the account. The historical information relating to money itself reflects activity that has occurred on the account, it does not constitute the activity itself. For example, money deposited or withdrawn from the account may have already occurred and be recorded separately to communication between the user device and the dedicated digital money box device. It is envisaged that this separation may be particularly important to maintaining the security and integrity of the account. It should also be appreciated that reference to the information being historical is not intended to imply the passage of a specific length of time, but rather that the associated activity has already occurred.

As such, reference to activity such as "allocation" of money to the dedicated digital money box device should be understood in this context—i.e. the allocation is of a representation of the historical transaction.

In exemplary embodiments the historical information may include, without limitation, details of individual transactions such as monetary value, the source of those transactions (for example, bank account number or a name), date, type of transaction (for example direct credit or cash deposit), and/or references associated with the transactions (For example, the references may identify the money as being for payment of a chore, or a gift). In exemplary embodiments, user-defined information may be included with the historical information. The user-defined information may be entered by the user, or initiated by activity of the user. For example, the user-defined information may include: savings goals (whether a monetary value and/or a descriptor of the goal), the name of the account(s), indicators of events or goals being achieved (for example an icon or badge to be displayed on a savings goal being reached), and/or a user reference.

It is envisaged that at least portions of the historical and/or user-defined information may be presented to the user when selecting money for allocation to the dedicated digital money box device, discussed further below, so as to encourage an understanding of the origins of that money and the actions associated with them. Further, such information may also be displayed on the dedicated digital money box device if so desired.

In exemplary embodiments the system may distinguish between different types of transaction which may occur on the account. For example, it may be desirable to distinguish activity such as bank interest or tax deduction transactions from other types of transaction such as deposits or withdrawals. In exemplary embodiments the user or person administering the account may be provided the ability to select the types of transaction that may be presented to the user, or designating their availability for selection for allocation to the dedicated digital money box device. For example, the user or person administering the account may be provided the ability to turn on or off the presentation of, or ability to select, specific types of transaction, such as bank interest or tax deduction transactions that occur on the account. By way of example, a parent or guardian may turn off presenting bank interest or tax deduction transactions for a young child whilst for older children turn on presenting all types of transactions. This may assist in educating the child about financial transactions in a staged or step-wise manner appropriate to their level of financial literacy. In exemplary embodiments the dedicated digital money box may display one or more of: the actual account balance based on all transaction types that have occurred on the account, a balance including only the presented or selected transaction types, or both balances (whether simultaneously, on an alternating basis, or on toggling by a user).

In exemplary embodiments, the user device may be configured to administer a plurality of accounts. For example, in the case of the user device being that of a parent or guardian, the user device may be configured to communicate with dedicated digital money box devices associated with different children with regard to transactions associated with the financial accounts of those individuals.

In exemplary embodiments, the user device may be a portable device, for example a mobile phone or a tablet computer. Such devices are typically configured for wireless communication and therefore may be particularly suited to exemplary embodiments of the present disclosure. It is envisaged that the steps of the methods herein described performed by the user device may be by a dedicated software application—commonly referred to in the art as an "app".

For ease of understanding, the software for performing sets of the method on the user device may herein be referred to as the "app"). However, it should be appreciated that this is not intended to be limiting, and in exemplary embodiments the user device may be another form of computing device—for example a personal computer, whether operating dedicated software for performance of the methods described herein, or accessing such functionality through a web browser.

In exemplary embodiments, the dedicated digital money box may be coupled, directly or indirectly, to an intermediate device, for example a docking device. The intermediate device may be configured to receive and deliver communications or data between the user device and the dedicated digital money box. The intermediate device may communicate with the dedicated digital money box or the user device using wired or wireless communication technology. In an exemplary embodiment the intermediate device may be used as a power source for the dedicated digital money box or the user device.

In further exemplary embodiments the intermediate device may provide additional functionality, for example a clock, an alarm, a calendar, an ability to receive or play media (for example, audio and more particularly music). In exemplary embodiments this additional functionality may be presented on or via the dedicated digital money box. By way of example, clock or calendar functionality may enable the dedicated digital money box to acknowledge or notify specific time related events such as birthdays or holidays.

In an exemplary embodiment the display device and user input device of the user device may be a touch screen. Such devices are becoming increasingly common in portable devices, and enable intuitive gesture based user input operations.

It should be appreciated that this is not intended to be limiting, and that alternate means for display and user input at the user device may be provided. For example, the user input device may include physical keys, one or more accelerometers, motion detection device, or any other suitable user input devices known in the art.

In an exemplary embodiment the user device may be configured to issue a notification on receiving information from the financial entity indicating that a money transfer has occurred. For example, an audible or visual notification may be issued by the user device to draw the user's attention to the transfer. In another embodiment, the icon for the app may display a visual indication that there are un-viewed transfers.

In an exemplary embodiment, the user device may be configured to display a graphical user interface on the display device. The graphical user interface may display information and control operations relating to the financial account and the dedicated digital money box.

In an exemplary embodiment, the user interface may enable selection of an individual account from a plurality of accounts. For example, where the user device is that of a parent or guardian, it may be desirable to use that device for multiple children. Similarly, the user device may be configured to identify individual dedicated digital money box devices within range of the user device, and match these to individual accounts.

The user interface may be used to enter goals or objectives for that account, and associated conditions. For example: a savings goal may be set, or an objective to earn pocket money for a certain number of weeks in a row.

In an alternative embodiment, goals or objectives for the account may be set, entered or selected using an input device of the dedicated digital money box. For example the dedicated digital money box may include a pre-set list of goals or objectives, may receive a list of goals or objectives from the user input device, or may allow direct entry of new goals or objectives.

In an exemplary embodiment, selection of a notification in the user interface of a transaction occurring may initiate a payment ceremony in which the virtual representation of the money is presented, selected for allocation to the dedicated digital money box device, and confirmed. Such a ceremony may reinforce the significance of individual transactions in contributing to achieving a financial goal (for example, saving a set amount towards a purchase), as well as providing a teaching opportunity for the parent or guardian to explain financial concepts using the imagery and associated process.

In an exemplary embodiment, the virtual representation of the money may include a pictorial representation. For example, the pictorial representation may be an image of a coin. It should be appreciated that reference to a pictorial representation may include both static and animated imagery.

In an exemplary embodiment, characteristics of the pictorial representation may reflect the relative value of the money. For example, different colours may be used to represent money within predetermined ranges of monetary value. These colours may, for example, reflect materials used for physical currency such as bronze coins for smaller values, silver coins for larger values, and gold coins for larger still values. In another exemplary embodiment, the pictorial representations may include images of different mediums of exchange—for example, coins for smaller values and banknotes for larger amounts. In another exemplary embodiment, the pictorial representations may reflect denominations of currency and/or quantity of such currency elements.

In an exemplary embodiment, the graphical user interface may include a plurality of pictorial representations which may be selected to achieve the value of the transaction. For example, an allocation of $30.00 to the dedicated digital money box device may include the selection of pictorial representations of a $20.00 note and a $10.00 note, or a $10.00 note three times.

In such an embodiment, the pictorial representations may be designated as not being selectable once they can no longer be used to achieve the total. For example, in the case of allocation of $30.00, $100.00 and $50.00 notes may be removed as selectable options, or $20.00 notes removed once a first $20.00 note is selected.

In an exemplary embodiment, the user input for selection of money for allocation to the dedicated digital money box device may be by way of a gesture. For example, the virtual representation of the money may be selected and flicked towards an edge of the display—although it should be appreciated that any other suitable gesture or motion may be used, such as tapping, pushing, sliding, swiping, pinching, pouring or the like. It is envisaged that this tactile control of the action may assist in developing a sense of the tangible nature of the money—i.e. that while the value of money is an economic concept, its management has real-world implications. Additionally, it is envisaged that this may provide an intuitive means for representing the transfer of virtual money to the dedicated digital money box device.

Additionally the selected money may be shown to transfer to the dedicated money box by any means such as moving, dropping, disappearing, jumping or similar.

In an exemplary embodiment the user interface may include a virtual representation of the dedicated digital money box device, wherein selection of money for allocation includes selecting the virtual representation of the money box. For example, the representation of the money may be selected and dragged to the representation of the money box—in a so-called "drag and drop" motion—although it should be appreciated that any other suitable gesture or motion may be used.

In an exemplary embodiment, the user interface may include an option to synchronise the balance displayed by the dedicated digital money box device with the balance of the account, without selection of individual portions of money for allocation to the dedicated digital money box device.

In an exemplary embodiment, the communication devices of both of the user device and the dedicated digital money box device may be configured to operate using wireless technology. In an exemplary embodiment, the wireless communication devices of both the user device and the dedicated digital money box device may be configured to operate using the wireless technology standard known as Bluetooth®. Bluetooth® may have desirable characteristics in the context of the present disclosure—providing a convenient means of establishing a secure communication link between designated devices, and having known techniques for power management. However, it should be appreciated that this is not intended to be limiting, and the wireless communication device may be any suitable means known to a person skilled in the art for the wireless communication of data between electronic devices.

In an alternative embodiment, the communication devices of both of the user device and the dedicated digital money box device may be configured to operate using wired technology. In some forms the dedicated digital money box may connect directly to the user device via a connector such as a Universal Serial Bus (USB) connection or other type of connection. In other forms, a cable may be provided between a connector of the user device and a connector of the dedicated digital money box. The wired connection allows data to be communicated between the user device and the dedicated digital money box. The wired connection may also be configured to provide power to, or charge, the dedicated digital money box from the user device or from an alternative power source (for example an intermediate device as described above).

Data transmitted within the system can be used for a variety of reasons including, but not restricted to, media updates, firmware alterations and data communication. Data may be transmitted directly between devices (i.e. point to point) or daisy chained with any compatible device(s) within the system. While security protocols may be enacted in both wired and wireless data communication, it is envisaged that this may require particular consideration in embodiments in which the dedicated digital money box, or intermediate device, include a port open to data. While most wireless communication standards integrate security protocols, the security of wired connections of consumer devices can be less well-considered. In the case of the dedicated digital money box, the wired connection may introduce a vulnerability through which the system may be compromised if security protocols are not put in place. By way of example, such security protocols may include the encryption of the data, or transmission of an agreed security code, prior to all authorised transmissions.

A dedicated digital money box device should be understood to mean a stand-alone electronic device configured to communicate with the user device for the purpose of receiving historical information associated with a financial account, and displaying at least a portion of that information. Money boxes have long been used as a means of storing physical currency, and it is envisaged the dedicated digital money box device may provide a tangible and intuitive representation of the financial account, while recognising the increasingly electronic environment in which financial transactions occur.

In an exemplary embodiment, the dedicated digital money box device may be configured to display, on the display device, an indication of a monetary value of a balance of at least the historical information associated with a most recently selected virtual representation, and historical information previously received by the dedicated digital money box device.

In an exemplary embodiments, the signal transmitted to the dedicated digital money box device may be indicative of information such as:
- details of one or more individual transactions, with the balance to be calculated by the processor of the dedicated digital money box device based on a previously recorded information;
- an accumulated amount—for example, multiple deposits and/or withdrawals—with the balance to be calculated by the processor of the dedicated digital money box based on previously recorded information;
- a current balance of transactions (including those previously allocated to the dedicated digital money box), as recorded by the app of the user device—i.e. the user device determines and transmits the updated value to the dedicated digital money box device for display.

It should be appreciated that in exemplary embodiments the dedicated digital money box may be configured to display more than a balance of allocated transactions. For example information about individual transactions, or selected groups of transactions. For example, the information may be filtered by factors such as source, date, reference, or any other suitable detail included in the historical or user-defined information.

In exemplary embodiments the display of information may be selected or configured by the user (whether via the user device, or a user input device as described further below).

In an exemplary embodiments, the signal transmitted to the dedicated digital money box device may cause the display of alerts. For example, the alert may include an indication of an objective being achieved—such as a predetermined amount being saved towards a saving goal, or chores being performed for a certain number of weeks in a row. It should be appreciated that the signal may trigger the display of a previously stored alert, or include details of such an alert for display. It should be further appreciated that similar alerts may be displayed by the user device.

The display of the dedicated digital money box device may be any suitable device known in the art. For example, the display may be an LED display.

In an exemplary embodiment, the display of the dedicated digital money box may be configured to operate when not in communication with the user device. For example, the display may be used to show the previously received historical and/or user-defined information, or the current time.

In an exemplary embodiment, the dedicated digital money box device may include a user input device for manual operation of certain functions of the dedicated digital money box device. For example, the user input device may provide controls for one or more of: powering the money box on and/or off, activating and/or deactivating the display, activating and/or deactivating the wireless connection device for connection to the user device, toggling through information to be displayed (such as details of individual transactions, or a balance). These may take the form of one or more buttons, touch or motion sensitive elements, microphones, cameras, accelerometers, or any other suitable user input device.

In an exemplary embodiment, the dedicated digital money box device may include an audio output device. For example, the audio output device may include a speaker. The dedicated digital money box device may be configured to output an audible indicator from the audio output device in response to information received from the user device, or predetermined activity. For example, a noise may be played on receiving a deposit to provide an audible indication of this occurrence in addition to the visual display.

In exemplary embodiments, the audio output device may be accessed by the user device outside of the functionality associated with the financial account. For example, the audio output device may be used as a wireless speaker by a music player of the user device. Similarly, the dedicated digital money box may include a music player (whether for streaming music, playing from memory, or accessing radio transmissions).

In an exemplary embodiment, the dedicated digital money box device may include a body, housing the electronic components providing the functionality herein described. While it should be appreciated that the exterior of the housing may take any number of forms, it is envisaged that this may present an opportunity to engage with children further by making it a decorative shape, as known with regard to traditional money boxes or "piggy banks".

It should be appreciated that while embodiments of the present disclosure are herein described with reference to money transferred to the financial account, it should be appreciated that in exemplary embodiments provisions may be made for withdrawal of money.

In an exemplary embodiment, the user device may be configured to receive and display details of money which have been withdrawn from the account. A withdrawal ceremony may be performed in a similar manner to the previously described payment ceremony.

In embodiments, the user device may communicate with the dedicated digital money box device to update the balance displayed based on such withdrawals—whether automatically, or on selection of the displayed details of the withdrawal by the user.

In an exemplary embodiment, a portable payment device may be provided. The payment device may be configured to enable access to money allocated from the account, to be used to pay for goods or services via a compatible point of sale device.

For example, the payment device may be a near-field communication (NFC) device dedicated to facilitating payment. NFC capability is a short-range communications capability, and may comprise RFID, Bluetooth®, infra-red, or other data transfer capability that can be used to exchange data between devices. It should be appreciated that while the payment device may herein be referred to as an NFC device, this is not intended to exclude other wireless capabilities. For example, the payment device may include a display device, for example an electronic ink display. The display device may be configured to display a scannable visible mark, for example a barcode, and more particularly a matrix barcode.

The payment device may be a passive device that receives power from an electromagnetic field provided by the transmitter of an external device in communication with it. In exemplary embodiments the payment device may be configured to be attached to or embedded in an object—for example a keychain, a wearable object (such as a badge, bracelet, or pendent), a sticker, or a card.

It is envisaged that in an exemplary embodiment, the payment device may maintain a unique identification associated with the financial account. In such an embodiment, money may not be transmitted to the device itself. Rather, the money may be allocated to the unique identification.

In an exemplary embodiment, the payment device may receive the money transfer from the user device. In an exemplary embodiment, the wireless communication device of the user device may be used to effect the transfer. The user device may be configured to transmit details of the transfer to the dedicated digital money box device for display of an updated balance—whether automatically, or on receiving instructions from the user to do so.

In an exemplary embodiment, the dedicated digital money box device may be configured to transmit the money transfer to the payment device on receiving instructions from the user device. For example, the wireless communication device of the digital money box device may be more suited to effecting transmission of information to the payment device than that of the user device. In an exemplary embodiment this may be performed by the wireless communication device used to communicate with the user device, or a device dedicated to communication with the portable payment device. In an exemplary embodiment the payment device may be configured to be physically connected to a communications port of the dedicated digital money box device.

In an exemplary embodiment, transfer of money to the device may require authorisation by an agent of the account—for example, a parent or guardian of the account holder.

For a firmware and/or software (also known as a computer program) implementation, the techniques of the present disclosure may be implemented as instructions (for example, procedures, functions, and so on) that perform the functions described. It should be appreciated that the present disclosure is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

In particular, it is envisaged that in exemplary embodiments methods described herein may be embodied in an application to be installed on a user device, where the application interacts with existing control functions and routines to implement the present disclosure.

A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The steps of a method, process, or algorithm described in connection with the present disclosure may be embodied directly in hardware, in a software module executed by one or more processors, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

BRIEF DESCRIPTION OF DRAWINGS

Further aspects of the present invention will become apparent from the following description which is given by way of example only and with reference to the accompanying drawings in which:

FIG. 4 is a flow diagram illustrating an exemplary method of setting up the exemplary digital money box device in accordance with an embodiment of the present disclosure;

FIGS. 5A-F are wireframes of an exemplary graphical user interface of a software application operating on the exemplary user device in accordance with an embodiment of the present disclosure

DETAILED DESCRIPTION

Figure 1:
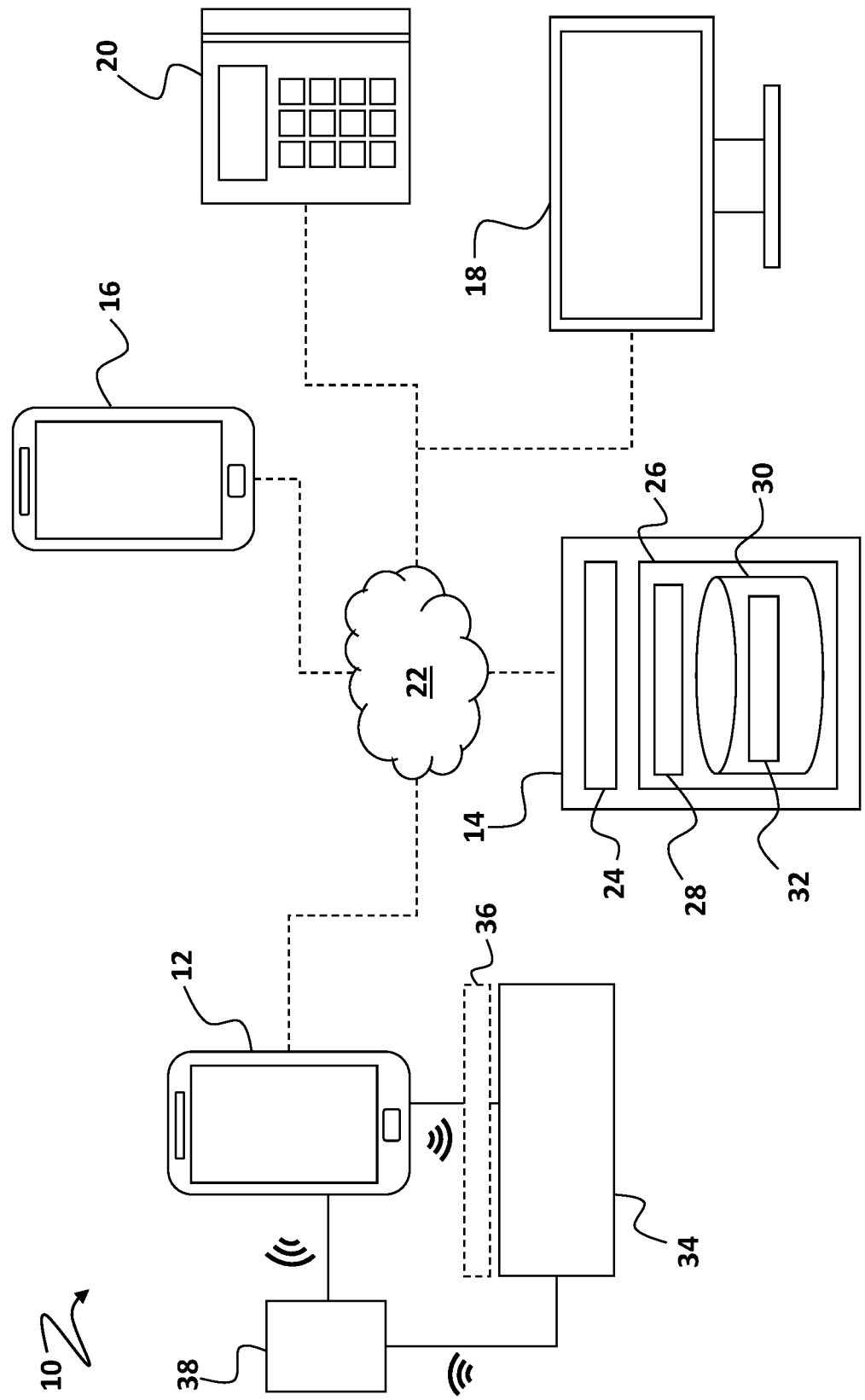
FIG. 1 is a schematic diagram of an exemplary networked computer system in accordance with an embodiment of the present disclosure.

FIG. 1 presents a schematic diagram of a computer system 10 depicting various computing devices that can be used alone or together in accordance with exemplary embodiments of the disclosure. In this exemplary embodiment illustrated, the system 10 includes a first mobile device (herein referred to as "the smartphone" 12), a server 14, a second mobile device 16, a personal computer 18, and a point of sale (POS) device 20. These devices may be interconnected via a network 22 potentially comprising various configurations and protocols including the Internet, intranets, virtual private networks, wide area networks, local networks, private networks using communication protocols proprietary to one or more companies—whether wired or wireless, or a combination thereof.

The server 14 is associated with a financial service provider, having a processor 24, memory 26, and other components typically present in such computing devices. In the exemplary embodiment illustrated the memory 26 stores information accessible by processor 24, the information including instructions 28 that may be executed by the processor 24 and data 30 that may be retrieved, manipulated or stored by the processor 24. The memory 26 may be of any suitable means known in the art, capable of storing information in a manner accessible by the processor, including a computer-readable medium, or other medium that stores data that may be read with the aid of an electronic device.

The processor 24 may be any suitable device known to a person skilled in the art. Although the processor 24 and memory 26 are illustrated as being within a single unit, it should be appreciated that this is not intended to be limiting, and that the functionality of each as herein described may be performed by multiple processors and memories, that may or may not be remote from each other.

The instructions 28 may include any set of instructions suitable for execution by the processor 24. For example, the instructions 28 may be stored as computer code on the computer-readable medium. The instructions may be stored in any suitable computer language or format.

Data 30 may be retrieved, stored or modified by processor 24 in accordance with the instructions 28. The data 30 may also be formatted in any suitable computer readable format. Again, while the data is illustrated as being contained at a single location, it should be appreciated that this is not intended to be limiting—the data may be stored in multiple memories or locations.

The data 30 stored on server may include a database 32 of financial account information—including account holder information, and financial account status information (for example: account balances, and transaction details such as value, source, type, date, and references).

Figure 2:
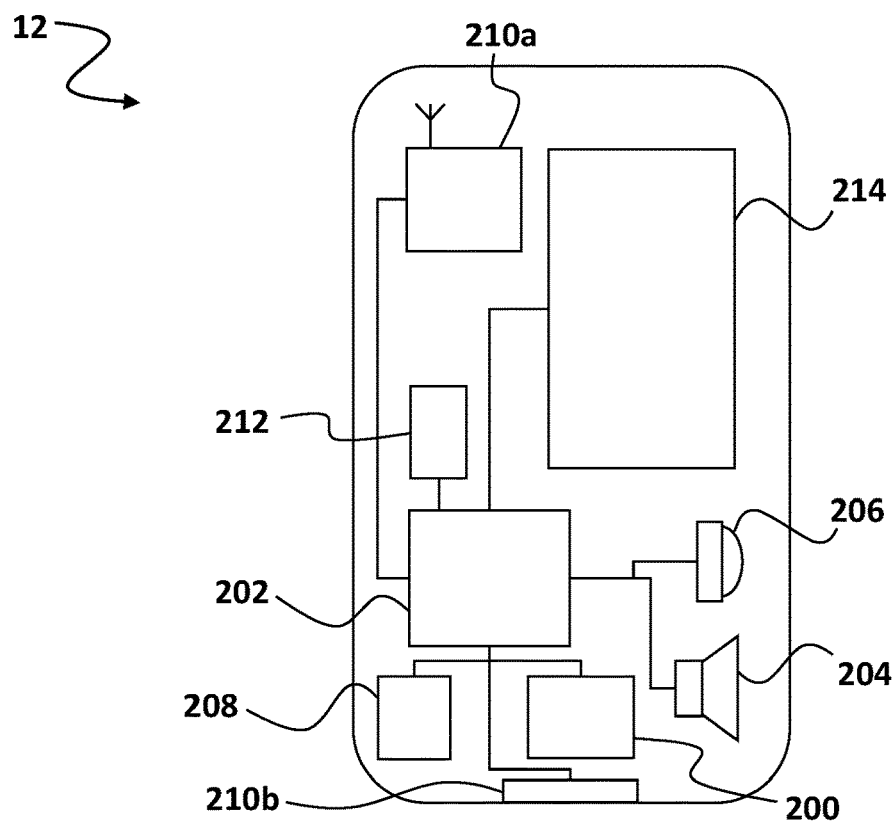
FIG. 2 is a schematic diagram of an exemplary user device in accordance with an embodiment of the present disclosure.

FIG. 2 is a block diagram of the smartphone 12. It should be appreciated that the smartphone 12 may have more or fewer components than shown, may combine two or more components, or may have a different configuration or arrangement of the components. The various components shown in FIG. 2 may be implemented in hardware, software, or a combination of both hardware and software, including one or more signal processing and/or application specific integrated circuits.

The smartphone 12 includes a memory 200 (which may include one or more computer readable storage mediums), one or more processing units (CPU's) 202, a speaker 204, a microphone 206, a battery 208, radio frequency (RF) circuitry 210a—the RF circuitry being capable of communication over mobile networks in addition to short range communication with other devices using the wireless technology standard known as Bluetooth®, as well known in the art—a connector port 210b for connection to a bus for connection, communication, and power supply between the smartphone 12 and other electronic devices, motion sensors such as accelerometers 212, and a touch screen 214.

The touch screen 214 provides an input interface and an output interface between the smartphone 12 and a user. The visual output may include graphics, text, icons, video, and any combination thereof (collectively termed "graphics"). In some embodiments, some or all of the visual output may correspond to user-interface objects, further details of which are described below. The touch screen 214 has a touch-sensitive surface, sensor or set of sensors that accepts input from the user based on contact. The touch screen 214 detects contact and associated movement, and determines whether that contact is intended to be interaction with user-interface objects displayed on the touch screen 214.

The one or more processors 202 run or execute various software programs and/or sets of instructions stored in memory 200 to perform various functions for the smartphone 12 and to process data. Software components stored in memory 200 may include an operating system and various modules or applications for controlling operation of the smartphone 12.

Referring to FIG. 1, the smartphone 12 communicates with a dedicated digital money box device (herein referred to as "the money box" 34). In an exemplary embodiment, an intermediate device such as a docking station 36 may be provided, configured to receive and deliver communications or data between the smartphone 12 and the money box 34.

Figure 3:
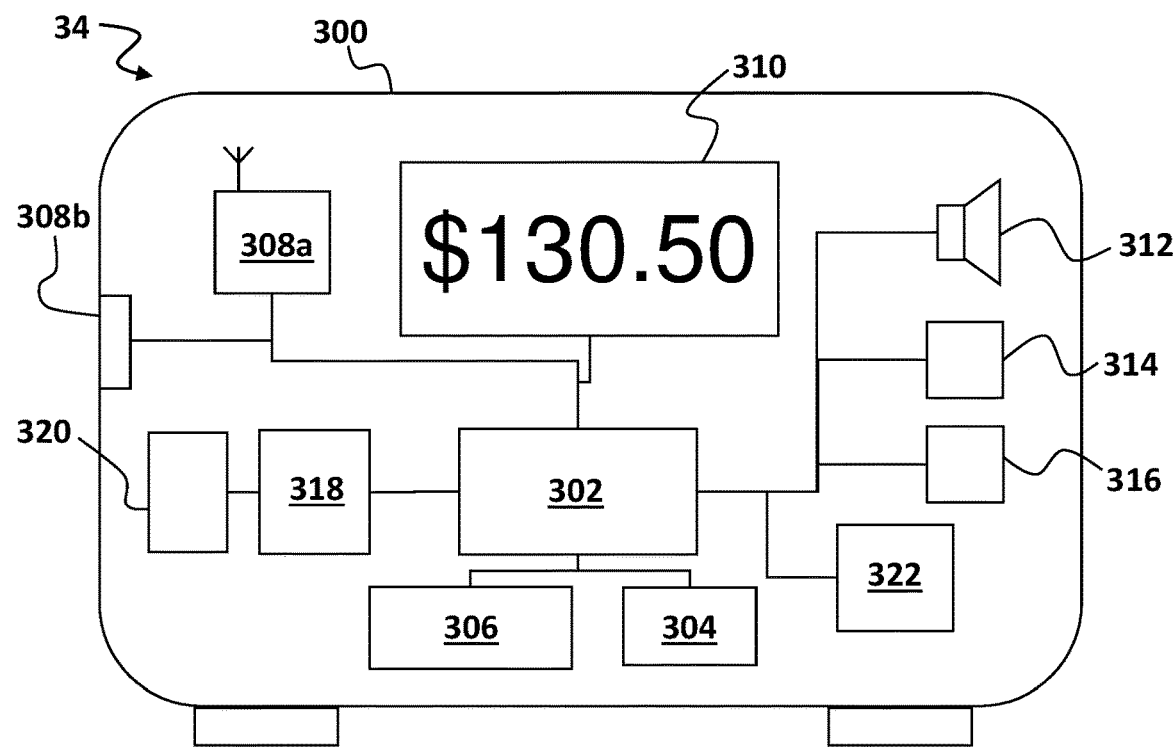
FIG. 3 is a schematic diagram of an exemplary digital money box device in accordance with an embodiment of the present disclosure.

As seen in FIG. 3, the money box 34 includes a housing 300 for numerous components. The money box 34 includes a processor 302 configured to run or execute software programs and/or sets of instructions stored in memory 304 to perform various functions as will be described further below.

Power is provided by a battery 306, although it should be appreciated that in embodiments an external power source may be provided. Such an external power source may be coupled to the money box 34 via a wired or wireless connection. In an exemplary embodiment the external power source may be provided by the docking station 36.

A wireless communication device, such as in the form of a Bluetooth device 308a, is provided for communication with the smartphone 12, as will be described further below. Additionally, or in place of, the wireless communication device, a connector port 308b is provided for connection to a bus for connection, communication, and power supply.

The money box 34 also includes a display 310—for example an LED display such as the 128×128 Pixel OLED Module supplied by Freetronics Pty Ltd at the time of application with the product code OLED128 (293).

The money box 34 may also include one or more additional output devices, for example an audio output device such as a speaker 312, and visible output devices such as LEDs 314. Manual user input devices are also provided—for example one or more buttons 316. A sound device 318 and dedicated memory 320 may be used to play sounds associated with various functions of the money box 34.

It should be appreciated that the various electronic components of the money box 34 may be integrated into combined packages, or modules. For example, the processor 302 and memory 304 may be that of a microcontroller (for example that supplied by Arduino at the time of application with the product name "Mega 2560™"), with the Bluetooth device 308 a Bluetooth Low Energy (BLE) Shield (for example that supplied by Red Bear Company Limited at the time of application with the product name "BLE Shield"), and the sound device 318 an MP3 Player Shield (for example that supplied by SparkFun Electronics at the time of application with the product code DEV-10628 RoHS). In an exemplary embodiment the components may be provided as a system on a chip.

FIG. 4 illustrates a method 400 for set up of a money box 34 for interaction with the smartphone 12. The various steps of the process will be described with reference to FIG. 5A through 5F, which illustrate a software application (herein referred to as "the app") operated by the smartphone 12, in conjunction with FIG. 1 through 3. It should be appreciated that where communication between the smartphone 12 and money box 34 is described in terms of wireless communication, this is not intended to be limiting to all exemplary embodiments, and that some or all of the steps or functions described may be performed over a wired connection in exemplary embodiments.

In step 402, the user of the smartphone 12 initialises the app through which the money box functionality is to be accessed. For example, the user of the smartphone 12 may be a parent or guardian of a child, who administers a financial account of the child. The app may be one provided by the financial provider for access to tools and resources for managing the accounts administered by the user.

In this exemplary embodiment, a landing page 500 displays selectable representations 502a, 502b, and 502c of accounts administered by the user. A selectable tab 504 is provided for accessing further functions via a drop down menu 506 as illustrated in FIG. 5B. In step 404 of the method 400, the user selects a money box access option 508 from the drop down menu 506.

Figure 5C:
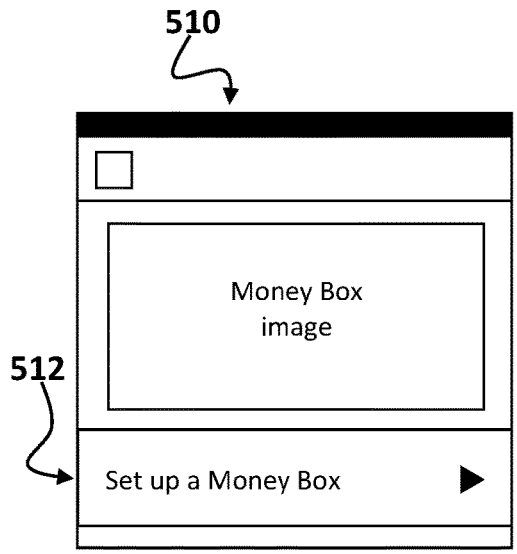
Figure 5D:
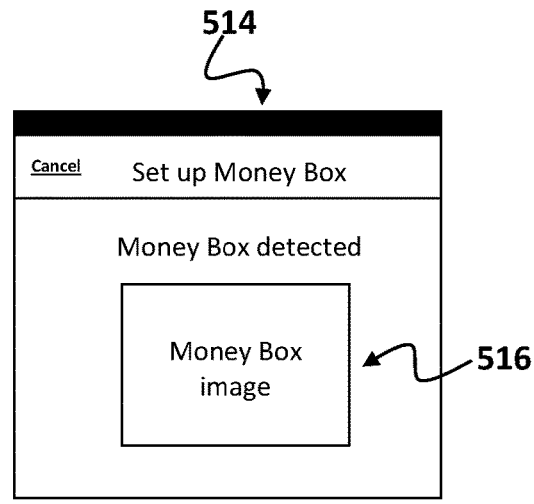
Figure 5E:
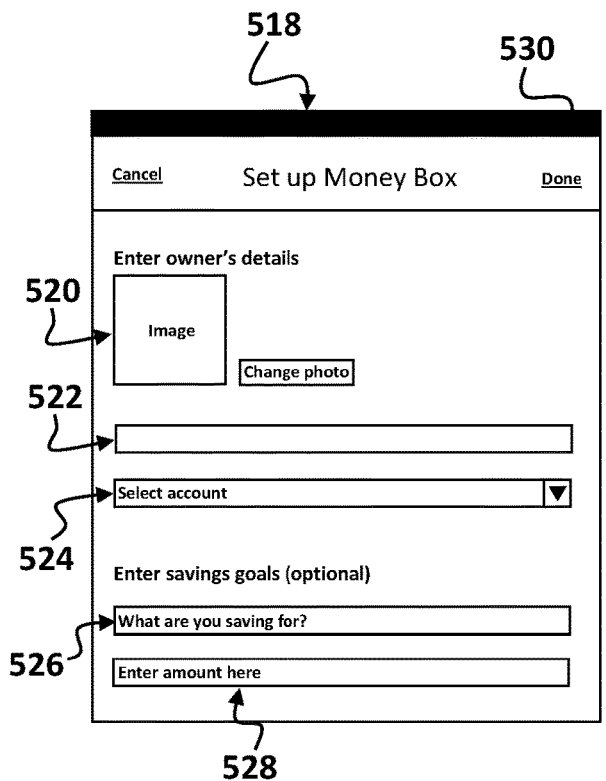
Figure 5F:
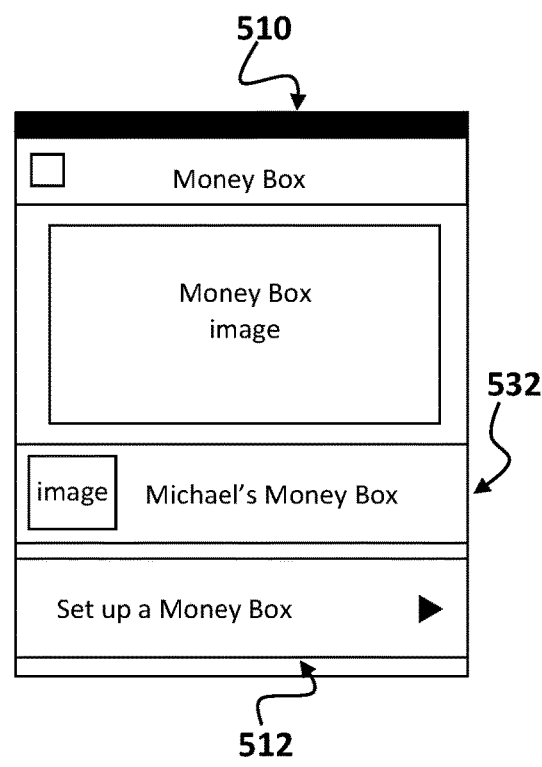

A money box access page 510 is shown in FIG. 5C. In this embodiment, no money boxes have been set up to interface with this user. In step 406 the user selects a money box set up option 512. This initiates a Bluetooth detection sequence in which the smartphone 12 searches for a money box (such as money box 34). On detection of the money box 34 in step 408, the user is presented with a money box detected screen 514, with a selectable icon 516 representing the detected money box 34.

On selection of the icon 516, a money box set up page 518 is displayed. Options are provided for uploading an image 520 for ready identification of the child associated with the money box 34, a name text field 522 for entry of their name, a drop down menu 524 for selection of the account to associate with the money box 34, a description text field 526 for describing a goal towards which the child is saving, and a value text field 528 for entering the value of the savings target.

On entry of the details in step 410, and confirmation of the details by selection of confirmation button 530, the user is returned to the money box access page 510, which now includes a selectable option 532 to access the money box 34.

Figure 6:
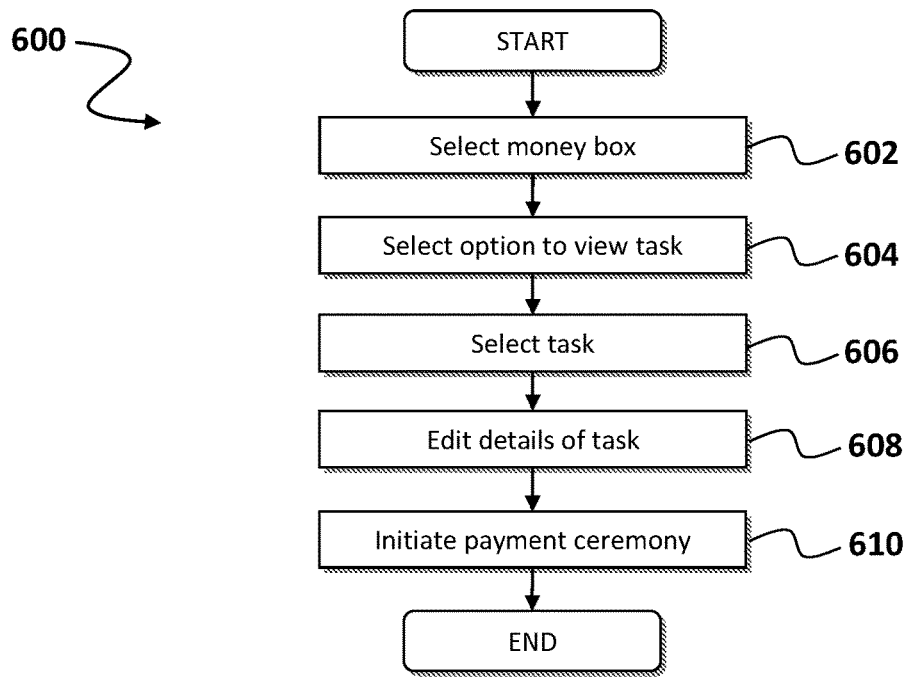
FIG. 6 is a flow diagram illustrating an exemplary method of initiating a payment ceremony in accordance with an embodiment of the present disclosure.
Figure 7A:
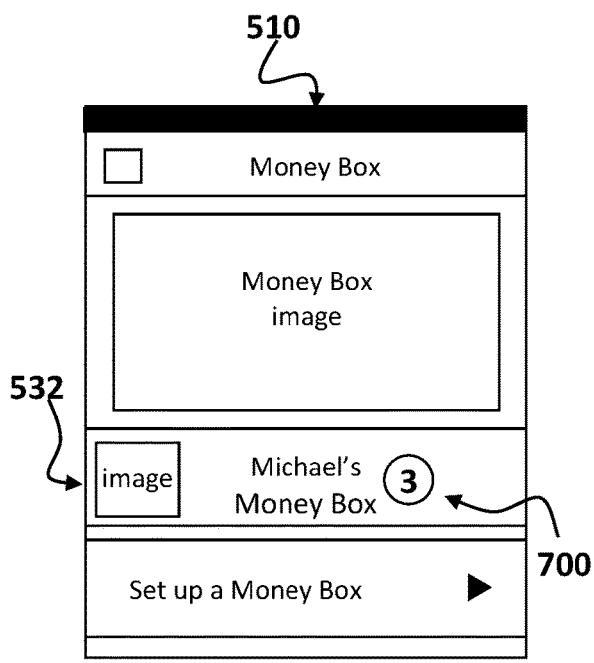
FIGS. 7A-E are wireframes of an exemplary graphical user interface of a software application operating on the exemplary user device in accordance with an embodiment of the present disclosure.

FIG. 6 illustrates a method 600 for initiating an allocation of money to the money box 34 using the smartphone 12. In step 602, and as seen in FIG. 7A, the user selects the selectable option 532 on money box access page 510 to access the money box 34. The app has communicated with the server 14 to identify that there are three transactions which have occurred, but are yet to be allocated using the app—this may be initially indicated by the numerical notification 700 on page 510.

Figure 7B:
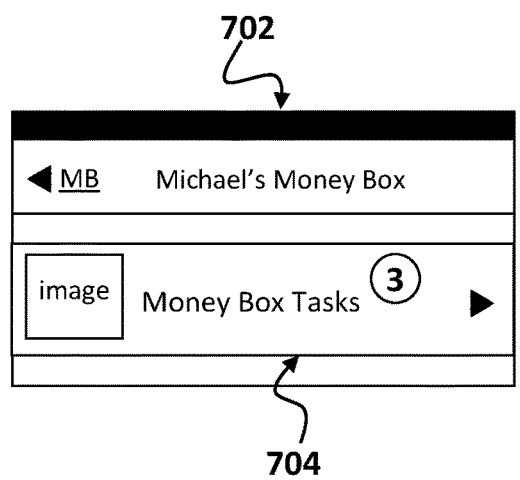
Figure 7C:
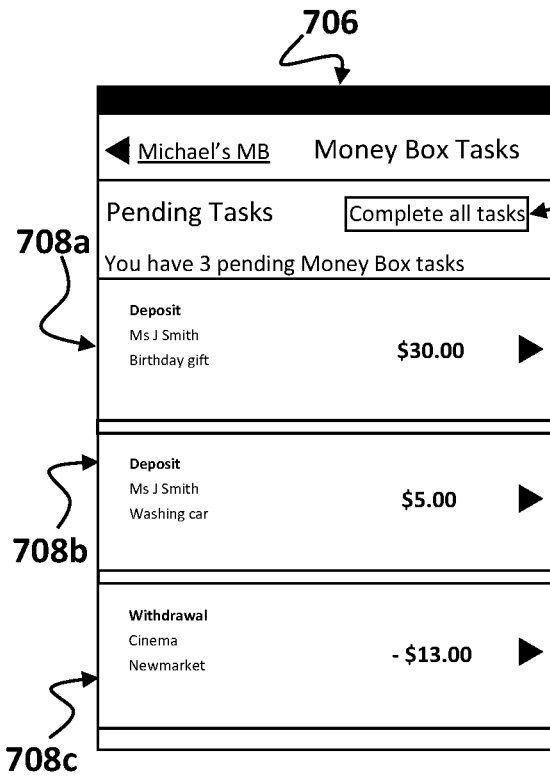

In FIG. 7B, a money box landing page 702 is shown, presenting an option to manage the selected money box 34—particularly a task viewing option 704. On selection of the task viewing option 704 in step 604 of the method 600, the user is presented with the task management screen 706—displaying individual selectable tasks 708a, 708b, 708c associated with transactions on the account. For example, the first task 708a may relate to a gift from the child's grandparents, the second task 708b may relate to payment for performance of a chore, and the third task 708c may relate to a withdrawal such as payment of a movie ticket. A complete all tasks button 710 is also provided.

Figure 7D:
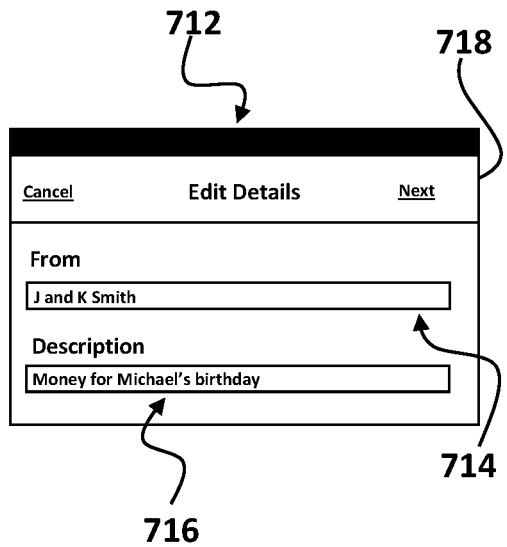

On selection of a task in step 606—for example selection of the first task 708a—the user may be presented with a task detail editing screen 712 (as seen in FIG. 7D), having a source text field 714 and description text field 716 for identifying the source of, and reason for, the transaction using terms understood by the child. One editing of the details of the task is completed in step 608, a payment ceremony may be initiated in step 610 on selection of the confirmation button 718.

Figure 7E:
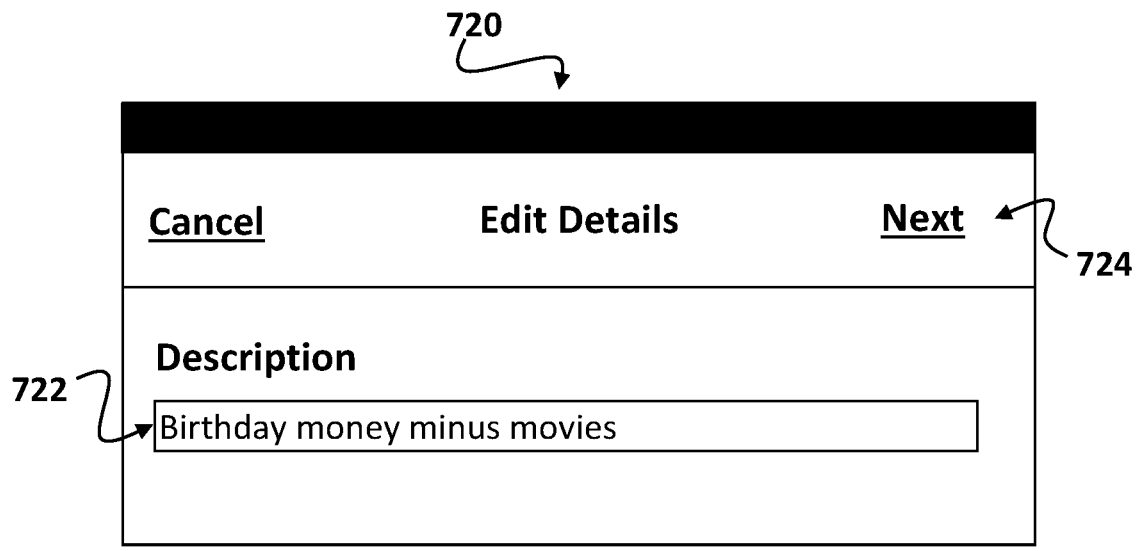

As an alternative to selection of the individual tasks 708a, 708b, 708c, the complete all tasks button 710 may be selected in step 606. This option collates all of the tasks into a single payment ceremony (i.e. subtracting the value of the withdrawal from the sum total of the deposits). The user is presented with an all task detail editing screen 720 (as seen in FIG. 7E) in which a description text field 722 is provided for description of the associated transactions prior to initiation of a payment ceremony on selection of the confirmation button 724.

Figure 8:
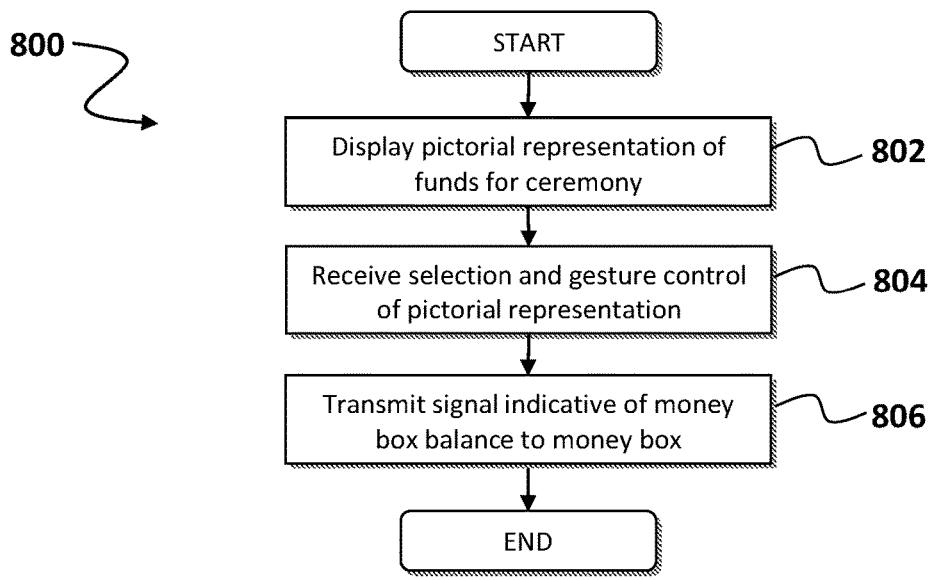
FIG. 8 is a flow diagram illustrating an exemplary method of performing a payment ceremony in accordance with an embodiment of the present disclosure.
Figure 9A:
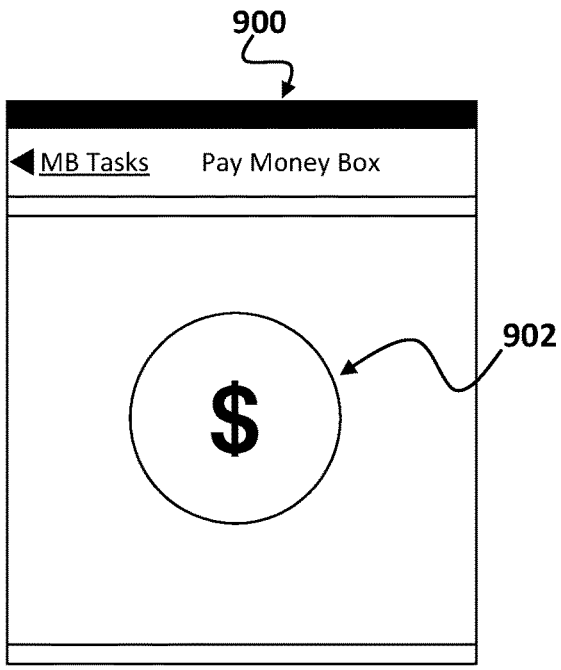
FIGS. 9A & B are wireframes of an exemplary graphical user interface of a software application operating on the exemplary user device in accordance with an embodiment of the present disclosure.

FIG. 8 illustrates a method 800 for performing a payment ceremony for allocating money to the money box 34 using the smartphone 12. In step 802, a pictorial representation of the money to be transferred is displayed in ceremony screen 900 (as seen in FIG. 9A)—in this exemplary embodiment the pictorial representation is a coin 902.

In step 804, the processor 202 of the smartphone 12 receives a signal from the touch screen 214 indicating that the child has selected the coin 902, and performed a gesture or motion to transfer the coin 902 to the money box 34, such as dragged or flicked in a direction towards the edge of the screen 214. It should be appreciated that such a gesture is provided by way of example and that other suitable gestures, or motions detected using accelerometers 212, may be utilised in exemplary embodiments.

In step 806, the smartphone 12 transmits a signal to the money box 34, indicative of the value of the transaction, or intended balance of the money box 34. For example, the app may calculate a balance to be displayed by the money box 34, based on records of completed payment ceremonies, and transmit this to the money box 34. In alternative embodiments, the individual values of the payment ceremonies may be transmitted to the money box 34, for calculation of the current balance at the money box 34. It should be appreciated that additional details associated with the account may also be transmitted to the money box 34—for example details of the money associated with the individual payment ceremonies such as source, date, type, and/or references.

Figure 9B:
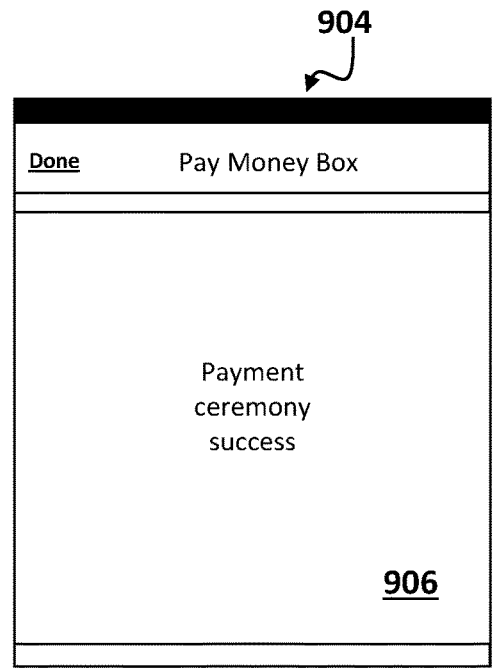

The app also displays a success screen 904 (as seen in FIG. 9B) with imagery or description 906 to congratulate the child on taking steps towards their goal.

Figure 10:
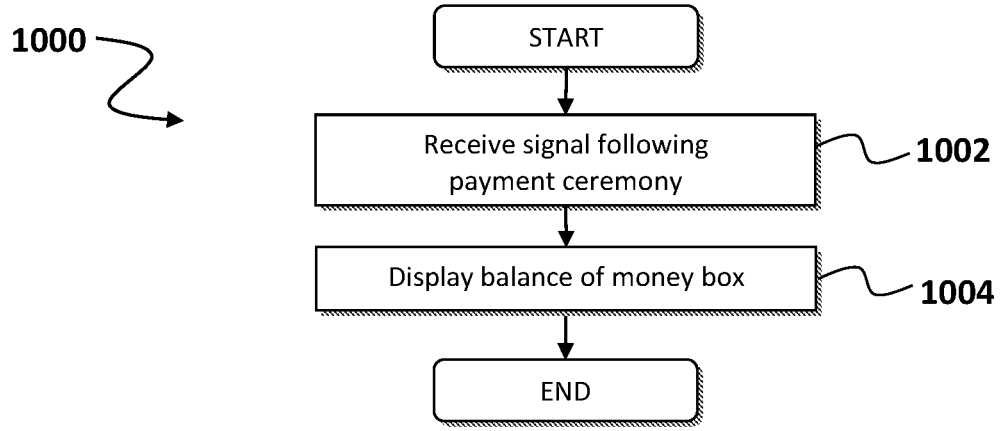
FIG. 10 is a flow diagram illustrating an exemplary method of operating the exemplary digital money box device in accordance with an embodiment of the present disclosure.

FIG. 10 illustrates a method 1000 of operating money box 34 on completion of a payment ceremony. In step 1002, the money box 34 receives, via Bluetooth device 308, the signal transmitted from the smartphone 12.

Depending on the configuration, the processor 302 of the money box 34 may obtain the current balance of payment ceremonies from the data in the signal, and store that value in memory 304. In another embodiment, the processor 302 may calculate the current balance of payment ceremonies performed based on records stored in memory 304.

In step 1004, the processor 302 controls the display 310 to present the current balance of payment ceremonies. Simultaneously, sounds may be played from the speaker 312, and the LEDs 314 illuminated, to emphasise that the payment ceremony has been successful. It should be appreciated that additional information associated with the account may be displayed in place of, or in conjunction with, the current balance.

Further, in the event of one or more predetermined conditions being met, an alert may be displayed on the display 310—for example a saving goal being reached. It should be appreciated that identification of the condition may be performed by the smartphone 12, and transmitted to the money box 34.

Figure 11:
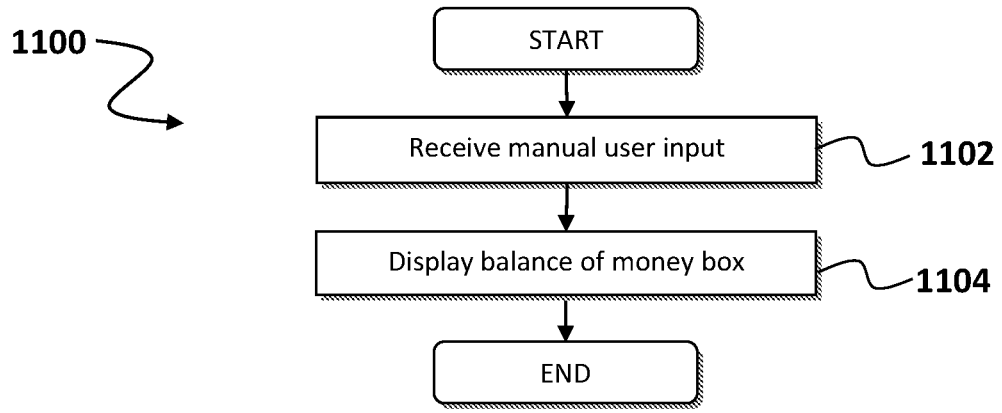
FIG. 11 is a flow diagram illustrating an exemplary method of operating the exemplary digital money box device in accordance with an embodiment of the present disclosure.

FIG. 11 illustrates a method 1100 of manually operating money box 34 to display the current balance of payment ceremonies. In step 1102, the processor 302 receives a signal indicating user activation of manual user input device 316. In step 1104, the processor 302 controls the display 310 to present the current balance of payment ceremonies. Simultaneously, sounds may be played from the speaker 312, and the LEDs 314 illuminated, as in method 1000. The sounds and/or illumination may be different from those of the payment ceremony—to allow for this to be readily distinguished.

Again, it should be appreciated that additional information associated with the account may be displayed in place of, or in conjunction with, the current balance.

Returning to FIG. 1, in exemplary embodiments a dedicated payment device 38 may be provided. Payment devices—for example near field communication (NFC) based payment devices are known in the art, as is point of sale technology for effecting payment using such devices.

While the payment device is depicted as being in communication with either the smartphone 12 and/or the money box 34, it is envisaged that exemplary embodiments may not have (or utilise) such functionality. For example, the payment device may have a unique identification code (UID)—capable of being read by the POS device 20—with money being allocated to the UID by the financial service provider independently of the smartphone 12 and/or money box 34. In embodiments, the app run by the smartphone 12 may enable the allocation of money to the UID, but this is not intended to be limiting.

However, it should be appreciated that in exemplary embodiments the payment device 38 may be programmed by the smartphone 12 (directly or via money box 34) to authorise expenditure of money using the device.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof as defined in the appended claims.

The invention claimed is:

1. A system for management of a financial account maintained by a financial entity, the system including:
   a user device including:
      a display;
      a user input device;
      a communications device; and
      at least one processor, configured to:
         receive historical information relating to the financial account, wherein the historical information includes at least a monetary value of at least one individual transaction of the financial account which has occurred prior to receiving of the historical information;
         display a virtual representation of the monetary value of at least the individual transaction on the display of the user device;
         receive, from the user input device of the user device, a signal indicating selection of the virtual representation by a user of the user device for transmission to a dedicated digital money box device; and
         transmit, from the communication device of the user device, a signal indicative of at least the historical information associated with the selected virtual representation; and
   a dedicated digital money box device, including:
      a money box communication device;
      a money box display device; and
      at least one processor configured to:
         receive the signal indicative of at least the historical information associated with the selected virtual representation; and
         display on the display device an indication of a monetary value of a balance of at least the historical information associated with the selected virtual representation, and historical information previously received by the dedicated digital money box device.

2. The system of claim 1, wherein the monetary value represented by the virtual representation includes one or more of the following:
   (i) a summed monetary value of a plurality of individual transactions;
   (ii) a pictorial representation; and/or
   (iii) a pictorial representation of physical currency.

3. The system of claim 1, wherein the processor of the user device is configured to perform one or more of the following:
   (i) select one of a plurality of virtual representations for display based on the monetary value of the at least one individual transaction;
   (ii) display a plurality of virtual representations for selection by a user to achieve the monetary value;
   (iii) designate at least one of the plurality of virtual representations as not being selectable once it can no longer be used to achieve the monetary value;
   (iv) display a virtual representation of the dedicated digital money box device, and the user input for selection of the virtual representation for transmission to the dedicated digital money box device includes selecting the virtual representation of the dedicated digital money box device following selection of the virtual representation of the monetary value of at least the individual transaction;
   (v) calculate the monetary value of the balance, and the signal received by the dedicated digital money box device includes the monetary value of the balance; and/or
   (vi) receive a signal indicating the input of an objective for an individual associated with the dedicated digital money box device.

4. The system of claim 3, wherein the objective includes a desired monetary value of the balance of the transactions.

5. The system of claim 3, wherein at least one of the user device and dedicated digital money box device are configured to issue an alert on determination of the objective being achieved.

6. The method of claim 5, wherein the method includes selectively displaying the virtual representation of the monetary value of the individual transaction based at least in part on the type of transaction.

7. The method of claim 5, wherein the method includes selectively allow selection of the virtual representation of the monetary value of the individual transaction based at least in part on the type of transaction.

8. The system of claim 1, wherein the user input for selection of the virtual representation for transmission to the dedicated digital money box device is by way of
   (i) a gesture;
   (ii) a flick towards an edge of the display;
   (iii) a motion; and/or
   (iv) selecting and dragging of the virtual representation of the monetary value of at least the individual transaction to the virtual representation of the dedicated digital money box device.

9. The system of claim 1, wherein the signal indicative of at least the historical information associated with the selected virtual representation includes the historical information of the at least one individual transactions, and the processor of the dedicated digital money box device is configured to calculate the monetary value of the balance based on the most recently received signal and the historical information previously received by the dedicated digital money box device.

10. The system of claim 1, wherein the historical information further includes at least one of: a source of the individual transaction, a date of the individual transaction, a type of transaction for the individual transaction, and a reference associated with the individual transaction.

11. The system of claim 10, wherein the processor of the user device is configured to selectively perform one or more of the following:
    (i) display the virtual representation of the monetary value of the individual transaction based at least in part on the type of transaction; and/or
    (ii) allow selection of the virtual representation of the monetary value of the individual transaction based at least in part on the type of transaction.

12. The system of claim 10, wherein the dedicated digital money box is configured to display historical information relating to one or more transactions.

13. The system of claim 1, wherein one or both of the communications device of the user device and the money box communication device includes a wireless communication device.

14. The system of claim 1, wherein the system includes an intermediate device to which the dedicated digital money box is coupled.

15. The system of claim 1, including a portable payment device configured to enable access to money allocated from the financial account, to be used to pay for goods or services via a compatible point of sale device.

16. The system of claim 15, wherein the portable payment device is configured to maintain a unique identification associated with the financial account.

17. The system of claim 15, wherein the payment device is configured to perform one or more of the following:
   (i) receive a signal indicative of the allocation of money from the user device;
   (ii) transmit a signal indicative of one or more details of the allocation of money to the dedicated digital money box device for display of an updated balance; and/or
   (iii) receive a signal indicative of the allocation of money from the dedicated digital money box device.

18. The system of claim 17, wherein the signal indicative of the allocation of money from the dedicated digital money box device is sent on receiving instructions from the user device.

19. A method for interacting with a financial account maintained by a financial entity, including:
   receiving, by a user device, historical information relating to the financial account, wherein the historical information includes at least a monetary value of an individual transaction of the financial account which has occurred prior to receiving of the historical information;
   displaying a virtual representation of the monetary value of at least the individual transaction on the display of the user device;
   receiving, from a user input device of the user device, a signal indicating selection of the virtual representation by a user of the user device for transmission to a dedicated digital money box device;
   transmitting, from the user device, a signal indicating selection of the virtual representation by a user of the user device for transmission to a dedicated digital money box device;
   receiving, by the dedicated digital money box device, the signal indicative of at least the historical information associated with the selected virtual representation; and
   displaying, on a display device of the dedicated digital money box, an indication of a monetary value of a balance of at least the historical information associated with the selected virtual representation, and historical information previously received by the dedicated digital money box device.

20. The method of claim 19, wherein the monetary value represented by the virtual representation is a summed monetary value of a plurality of individual transactions.

21. The method of claim 19, wherein the virtual representation includes a pictorial representation.

22. The method of claim 19, wherein the method includes performing one of more of the following:
   (i) selecting one of a plurality of virtual representations for display based on the monetary value of the at least one individual transaction;
   (ii) displaying a plurality of virtual representations for selection by a user to achieve the monetary value;
   (iii) designating at least one of the plurality of pictorial representations as not being selectable once it can no longer be used to achieve the monetary value;
   (iv) displaying a virtual representation of the dedicated digital money box device, and wherein selection of the virtual representation for transmission to the dedicated digital money box device includes user selection of the virtual representation of the dedicated digital money box device following selection of the virtual representation of the monetary value of at least the individual transaction;
   (v) calculating the monetary value of the balance at the user device, and the signal received by the dedicated digital money box device includes the monetary value of the balance;
   (vi) receiving, at the user device, a signal indicating the input of an objective for an individual associated with the dedicated digital money box device; and/or
   (vii) receiving, at the dedicated digital money box device, a signal indicating the input of an objective for an individual associated with the dedicated digital money box device.

23. The method of claim 11, wherein the objective includes a desired monetary value of the balance of the transactions.

24. The method of claim 11, wherein the method includes issuing an alert from at least one of the user device and dedicated digital money box device on determination of the objective being achieved.

25. The method of claim 19, wherein the user input for selection of the virtual representation for transmission to the dedicated digital money box device is by way of one or more of the following:
   (i) a gesture;
   (ii) a flick towards an edge of the display;
   (iii) a motion; and/or
   (iv) selecting and dragging of the virtual representation of the monetary value of at least the individual transaction to the virtual representation of the dedicated digital money box device.

26. The method of claim 19, wherein the historical information associated with the selected virtual representation includes the historical information of the at least one individual transaction, and the method includes calculating, by the dedicated digital money box device, the monetary value of the balance based on the most recently received signal and the historical information previously received by the dedicated digital money box device.

27. The method of claim 26, wherein the method includes displaying historical information relating to one or more transactions on the display device of the dedicated digital money box.

28. The method of claim 19, wherein the historical information further includes at least one of: a source of the individual transaction, a date of the individual transaction, a type of transaction for the individual transaction, and a reference associated with the individual transaction.

29. The method of claim 19, wherein the user device is configured to communicate wirelessly with the dedicated digital money box.

30. The method of claim 19, wherein the method includes transmitting a signal to a portable payment device indicative of the allocation of money from the financial account to be accessible by the portable payment device.

31. The method of claim 30, wherein the user device transmits the signal to the portable payment device, and the method includes transmitting a signal indicative of one or more details of the allocation of money to the dedicated digital money box device for display of an updated balance.

32. The method of claim 30, wherein the dedicated digital money box device transmits the signal to the portable payment device.

33. The method of claim 32, wherein the method includes transmitting the signal to the portable payment device from the dedicated digital money box device on receiving instructions from the user device.

34. A non-transitory computer readable medium having stored thereon processor readable instructions, which when executed by at least one processor cause the processor to perform a method for interacting with a financial account maintained by a financial entity, including:
- receiving, by a user device, historical information relating to the financial account, wherein the historical information includes at least a monetary value of an individual transaction of the financial account which has occurred prior to receiving of the historical information;
- displaying a virtual representation of the monetary value of at least the individual transaction on the display of the user device;
- receiving, from a user input device of the user device, a signal indicating selection of the virtual representation by a user of the user device for transmission to a dedicated digital money box device;
- transmitting, from the user device, a signal indicating selection of the virtual representation by a user of the user device for transmission to a dedicated digital money box device;
- receiving, by the dedicated digital money box device, the signal indicative of at least the historical information associated with the selected virtual representation; and
- displaying, on a display device of the dedicated digital money box, an indication of a monetary value of a balance of at least the historical information associated with the selected virtual representation, and historical information previously received by the dedicated digital money box device.

* * * * *